J. F. JENNINGS.
VALVE FOR CORROSIVE LIQUIDS.
APPLICATION FILED FEB. 13, 1911.

1,021,681.

Patented Mar. 26, 1912.

Witnesses:
H. J. Gittins
N. L. McDonnell

Inventor:
John F. Jennings
by Lynch & Doer
his Attorneys.

UNITED STATES PATENT OFFICE.

JOHN F. JENNINGS, OF CLEVELAND, OHIO.

VALVE FOR CORROSIVE LIQUIDS.

1,021,681.  Specification of Letters Patent.  Patented Mar. 26, 1912.

Application filed February 13, 1911. Serial No. 608,259.

*To all whom it may concern:*

Be it known that I, JOHN F. JENNINGS, a citizen of the United States of America, residing at Cleveland, in the county of Cuyahoga and State of Ohio, have invented certain new and useful Improvements in Valves for Corrosive Liquids; and I hereby declare the following to be a full, clear, and exact description of the invention, such as will enable others skilled in the art to which it pertains to make and use the same.

This invention relates to improvements in valves and particularly to valves which are employed in systems for conveying acids or other corrosive liquids.

The object of the invention is the provision of a valve which is strong and durable and has a construction such that all parts are protected against the corrosive action of liquids, have long life and need not be frequently replaced or repaired.

With these objects in view and to the end of securing other objects and advantages hereinafter appearing, the invention may be briefly summarized as consisting in certain novel details of construction and combination and arrangements of parts which will be described in the specification and set forth in the appended claims.

For an understanding of my invention reference is had to the accompanying sheet of drawings wherein—

Figure 1:
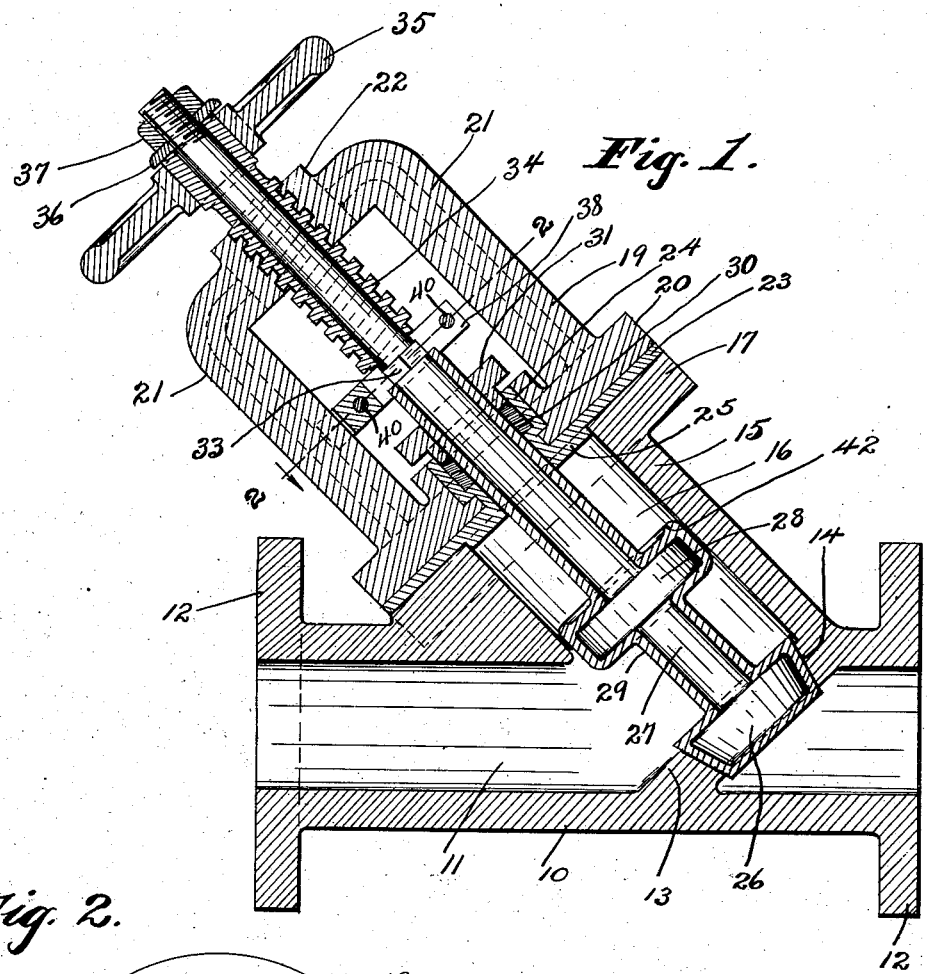
Figure 2:
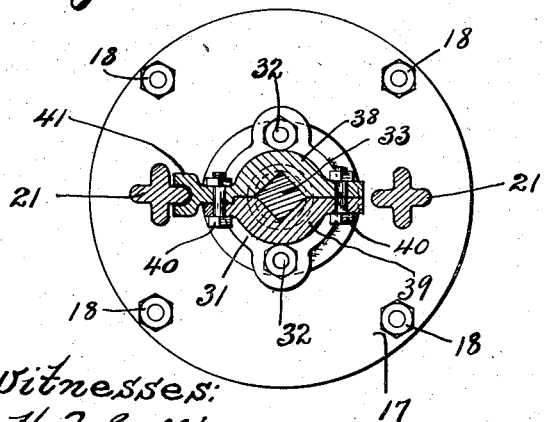

Figure 1 is a sectional elevation of a valve constructed in accordance with my invention. Fig. 2 is a section substantially along the line 2—2, Fig. 1, looking in the direction indicated by the arrow.

Referring now to the figures of the drawings it will be seen that I have provided a valve having a casing 10 which is provided with a main chamber or passageway 11 extending therethrough and at the ends has coupling flanges 12 by means of which the valve may be coupled in the usual manner to the pipe sections. This valve casing is formed of a non-corroding metal or alloy which is preferably formed particularly for use in valves through which acids or other corrosive liquids are carried. The valve chamber is provided with a partition 13, which, in this case, is inclined with reference to the axis of the chamber and is provided with a valve opening 14, the wall of which is tapered or flaring forming a valve seat. Directly opposite the valve opening 14 is a tubular neck or extension 15 which, in this case, is inclined with reference to the chamber or body portion of the valve and is provided with a passageway 16 which communicates with the chamber or passageway 11. The tubular extension 15 is provided at its outer end with a flange 17 to which is secured by bolts 18 a yoke 19 having a base 20 and a pair of arms 21 provided at their union opposite the base 20 with a hub or boss 22. The base 20 of the yoke 19 is provided with a central opening for a valve stem to be referred to presently and with a stuffing box recess or opening. The yoke 19 is preferably formed of cast iron, and in order that it may not be corroded or damaged by corrosive liquids, I provide on the under side of the base 20 a layer or lining 23 of lead or other noncorrodible metal preferably in the form of a sheet or plate, and this sheet or layer is provided with a centrally located opening for the valve stem and is extended upwardly and outwardly through the opening in the base 20 and lines the stuffing box recess, as shown at 24. The lead sheet 23 is provided with a thickened portion 25 which extends down into the mouth of the passageway 16 of the tubular neck or projection 15, the lower face of this thickened portion being preferably flat and smooth so as to form a seat for a member to be referred to presently.

Arranged to coöperate with the valve opening 14 is a valve member 26 which is tapered, as shown, so as to conform to the shape or configuration of the valve opening 14, and this valve member 26 is carried by a valve stem 27 which extends outwardly through the passageway 16, through the stuffing box and through a threaded opening in the hub or boss 22 in the outer end of the yoke 19. Arranged on the stem 27 a suitable distance above the valve member 26 is a flange 28 which is slightly smaller than the passageway 16 and is adapted to be shifted longitudinally in said passageway. The valve member 26, stem 27 and flange 28 are preferably integral and are formed of any suitable metal such as cast iron. In order that these parts may not be damaged by corrosive liquids they are covered with a layer 29 of lead or other non-corrodible material, this layer of lead extending upward along the stem a suitable distance beyond the base 20 of the yoke 19. This layer of lead is preferably placed on the valve stem and the parts carried thereby so as to be of uniform thickness particularly over the valve member 26 so that the stem will slide easily through the stuffing-box opening and so that the outer surface of the layer or coating on the valve member 26 is tapered and will conform exactly to the shape of the valve seat. The leakage of the liquid along the stem is prevented mainly by means of packing 30 in the stuffing-box recess, this packing being held in place by an ordinary gland 31, which is secured by bolts 32 to the top of the base 20, the stem with its layer of lead being adapted to have a close but working fit in the opening in the gland 31.

At the top of the lead layer or coating 29 which projects a short distance above the gland 31 when the valve is closed the stem is provided with a squared portion 33 the purpose of which will be referred to presently and surrounding the outer portion of the stem with a close or working fit and located above the squared portion 33 is a threaded sleeve 34 which passes through and coöperates with the threaded opening provided in the boss or hub 22 of the yoke 19 and is adapted to turn on the stem. The outer end of the sleeve is provided with a hand wheel 35 and the sleeve is held from endwise movement on the stem 27 by a washer 36 and nut 37 which is screwed onto the end of the stem which projects beyond the hand wheel 35. In order that the stem may not turn when the hand wheel is turned so as to injure or wear away the lead coating on the valve member 26, I have provided means for holding the stem 27 against rotary movement when the hand wheel is turned. This is accomplished in this case by a guide shown most clearly in Fig. 2 and consisting preferably of two members 38 and 39 which are clamped together by means of bolts 40 about the squared portion 33 of the stem, the member 38 projecting outwardly and having a groove which receives with a sliding fit a rib on one of the arms 21 of the yoke 19. It will be seen that with this construction when the hand wheel 35 is turned the threaded sleeve 34 is turned and is moved longitudinally by its engagement in the threaded opening of the hub or boss of the yoke, but the stem and valve 26 are given endwise or longitudinal movements only and the valve will seat nicely onto the valve seat without any turning or grinding action which would be likely to injure the lead coating. By forming the guide in two parts in the manner shown, it is possible to remove the guide without taking the valve apart, in case it is desired to turn the stem or to permit the same to turn with the sleeve and hand wheel.

It has been found in valves, which are especially constructed for use in systems for conveying corrosive liquids, that although non-corrodible metal is employed for certain parts and other parts are coated with non-corrodible metal as here shown, there is a leakage of the liquid along the stem into the stuffing box and the liquid which enters the stuffing box easily corrodes the packing with the result that if there is considerable pressure in the system the packing will sooner or later be blown out, necessitating a frequent renewal of the stuffing box packing. To overcome this difficulty the flange 28 is provided and this flange is so arranged that when the valve member 26 is substantially in full open position and the liquid passes through the chamber under full pressure, the top or upper face of the lead coating or layer over the flange 28, which portion of the lead coating is preferably provided along its outer edge with a bead or annular ridge 42, engages or seats against the lower face of the thickened portion 25 of the lead lining or layer 23 which projects into the mouth of the passageway 16. When the top of the lead layer on the flange 28 seats against the lower portion 25 of the lead lining or coating 23, the passage of liquid under pressure along the valve stem or along the outer surface of the lead coating of the valve stem is prevented and there is therefore no leakage of the liquid into the stuffing box when the valve is in full open position. It will be seen, therefore, that none of the parts are subject to corrosive action of the liquids conveyed through the valve because of the non-corrodible material of which the parts engaged by the liquid are constructed or coated, and because of the arrangement and construction of parts which prevent, leakage into the stuffing box and corrosion of the packing which in ordinary valves of this type must be frequently renewed. Furthermore the valve is so constructed that it is strong and durable and the parts may be readily assembled or taken apart.

What I claim is,—

1. In combination, in a valve for use with corrosive liquids, a valve casing formed of non-corrodible metal and provided with a valve chamber or passageway extending therethrough and with a partition having a valve opening, a tubular extension provided with a passageway which communicates with the chamber and is in line with the valve opening, a yoke secured to the end of said tubular extension and comprising a base which closes the passageway in said extension and is provided with an opening for a valve stem and with a stuffing box, a valve member coöperating with the valve opening, a stem carrying said valve member, said valve member and the portion of the stem extending inwardly through the stuffing box being coated with non-corrodible metal, a sleeve rotatably mounted on the outer portion of the stem and engaging in a threaded opening of the yoke, said stem having adjacent the inner end of the sleeve a squared portion, a hand wheel secured to the sleeve for turning the same, means for preventing rotary movement of the stem when the sleeve is turned comprising a guide which is clamped about the squared portion of the stem and slidingly engages the yoke, said stem extending entirely through the sleeve and beyond the end thereof, and means on the outer end of the sleeve for preventing endwise movement of the sleeve on the stem.

2. In combination, in a valve for use with corrosive liquids, a casing formed of non-corrodible metal and provided with a chamber or passageway extending therethrough, said chamber having a dividing partition provided with a valve opening, said casing having a tubular neck provided with a passageway which is in line with the valve opening and communicates with the chamber, a yoke secured to said tubular extension and having a base which closes the passageway therein and is provided with an opening for a valve stem and with a stuffing box, a layer of non-corrodible metal between the base of the yoke and the adjacent end of the tubular extension, said layer extending upwardly through the opening of the base and lining the interior of the stuffing box, a valve member coöperating with said valve opening, a stem carrying the valve member, said stem extending outwardly through the stuffing box, and the valve member and the portion of the stem extending inwardly through the stuffing box being covered with non-corrodible metal, said yoke having a threaded opening in line with the valve opening, a sleeve mounted on the outer portion of the stem and engaging in said threaded opening, said stem having adjacent the inner end of the sleeve a squared portion, means for preventing rotary movement of the stem comprising a two-part guide clamped about the squared portion of the stem and slidably engaging the yoke, the stem extending through the sleeve beyond the outer end thereof, a hand wheel secured on the outer portion of the sleeve for turning the same and causing endwise movement of the valve stem, and a nut on the outer end of the stem for holding the sleeve in position on the stem and for preventing endwise movement thereof relative to the stem.

In testimony whereof, I sign the foregoing specification, in the presence of two witnesses.

JOHN F. JENNINGS.

Witnesses:
VICTOR C. LYNCH,
N. L. McDONNELL.